June 6, 1944.	S. C. COEY	2,350,590
EVAPORATIVE COOLING
Filed March 20, 1941

Inventor:
Stewart C. Coey
By Pierce & Scheffler
Attorneys.

Patented June 6, 1944

2,350,590

UNITED STATES PATENT OFFICE 2,350,590

EVAPORATIVE COOLING

Stewart C. Coey, Glen Ridge, N. J., assignor to Research Corporation, New York, N. Y., a corporation of New York Application March 20, 1941, Serial No. 384,403

6 Claims. (Cl. 261—111)

This invention relates to a method and apparatus for the efficient and economical contacting of gases and liquids. The invention is particularly suitable for the cooling of water by the evaporative cooling effect of a current of air or other gas having a substantial capacity for evaporation of the water and the advantages of the invention will be more particularly described with reference to such evaporative cooling.

It has been recognized that efficient cooling of water by the evaporative cooling effect of a current of air requires that a large surface of the water be exposed to contact with the air and it has also been recognized that to obtain the greatest possible degree of cooling, that is, to cool the water to a temperature approaching the wet bulb temperature of the available air, the flow of air and water should be counter-current, so that the warmest water contacts the most nearly saturated air and the water of lowest temperature is contacted with air of lowest wet bulb temperature. While a large extent of contact surface may readily be provided by subdividing the water into droplets, as by spray devices, it has been found that the greater the extent of subdivision the more difficult it becomes to maintain counter-current flow of air and water, as the fine droplets of water are carried along with the air stream. In order to avoid this difficulty, evaporative cooling methods and devices have hitherto relied largely upon the use of extended solid surfaces such as perforated sheets and packing materials over which the water was caused to flow downward in contact with a generally upward current of air. These methods and devices have the serious drawback of introducing a substantial resistance to the flow of air, thereby entailing a loss of pressure or the necessity for blowers of increased cost and power consumption for maintaining the flow of air. Moreover, the substantial loss of head in passing through the apparatus very definitely limited the length of the path of contact as when a definite length of path is exceeded the air pressures at the air supply end of the apparatus become too large to be withstood by any economical construction. In addition, the air velocities in apparatus of this character must be kept at a relatively low figure to prevent "channeling" and local or general blowing of the liquid off the surface of the packing material. This limitation very greatly reduces the space efficiency of the apparatus.

It has been found that, at a certain range of air velocities, an upward stream of air will disperse a downward stream of water in contact therewith into droplets which for at least a substantial period of time will be in equilibrium with the force of gravity and which will therefore float at a substantial constant position in the air stream. This balancing of the dispersing and the buoyant action of the air stream occurs at air velocities of the order of 1300 feet per minute which may be referred to as "equilibrium velocities." It has been further found that by deflecting the direction of flow of the air stream from the vertical so as to give it a horizontal component while maintaining the velocity at substantially equilibrium velocity, the water particles tend to float across said air stream in the direction of deflection, so that if the stream of water is supplied to the deflected air stream, for example, at a lateral boundary thereof, it will be dispersed into droplets which float across the air stream and are deposited across the air stream substantially at the level at which the water was supplied. Utilizing these phenomena it has been found that a very close approach to the theoretical degree of cooling can be obtained with a very low pressure drop of the air and a very high space efficiency by passing a stream of water generally downwardly through a generally upward stream of air in a succession of lateral paths in the same or alternating directions across the air stream, the air stream being maintained at a velocity of from about 1100 to about 1500 feet per minute and being deflected from its vertical upward direction in the zone including said lateral paths. For example, the air stream may be deflected continuously throughout a plurality of zones of successive contact paths, wherein the water is successively dispersed in the air stream, transported laterally across the air stream and redeposited at the opposite boundary of the air stream, or the air stream may be deflected at a plurality of levels at alternate boundaries of the stream to provide a plurality of successive zones of alternating divergence from vertical flow, in each of which the stream of water is successively dispersed in the air stream, transported laterally across the air stream and redeposited at the opposite boundary of the air stream.

In each zone defined by such lateral passage the stream of water tends to approach the wet bulb temperature of the air in said zone due to the sustained, extended surface contact of the air and water stream during the lateral passage.

In order to obtain an effective dispersion and lateral transportation of the water across the air stream without excessive transfer of dispersed water particles directly from one zone of contact to a higher zone, it is desirable that the water stream be supplied in the proportion of at least 3 gallons to each 1000 cubic feet of air, and preferably in the range of from 5 gallons to 12.5 gallons per 1000 cubic feet of air. Greater proportions of water can be effectively dispersed by the method of the invention, but the efficiency of heat exchange between air and water is substantially decreased at proportions over 12.5 gallons per 1000 cubic feet of air as well as below 5 gallons per 1000 cubic feet of air, the optimum proportion for normal operating conditions being about 8¾ gallons per 1000 cubic feet of air.

The apparatus of the invention comprises, in general, a conduit defining a substantially unobstructed rectilinear path for the flow of gas in a generally upward direction through at least one zone of divergence from the vertical, means for successively introducing a stream of liquid into the conduit at an upper lateral boundary of a zone of divergence, collecting the liquid at the opposite boundary of said conduit and reintroducing the collected liquid into the conduit at an upper lateral boundary of a zone of divergence at a level lower than the level of collection. The term "substantially unobstructed rectilinear path" is intended to define a path in which straight line flow of gas through at least two successive stages of gas and liquid contact is possible and is intended to distinguish the apparatus of the invention from apparatus in which the gas is forced, by packing or other overlapping obstructions, to follow a tortuous path of flow through the contact zone.

The deflection of the air stream may advantageously be effected by means of vanes or other members projecting horizontally into the air stream, said members likewise forming, or forming a portion of, collecting and redistributing means for the water deposited from the air stream above said members.

The invention will be more particularly described for the purpose of illustration with reference to the accompanying drawing showing cooling towers embodying the principles of the invention. In the drawing.

Figure 1:
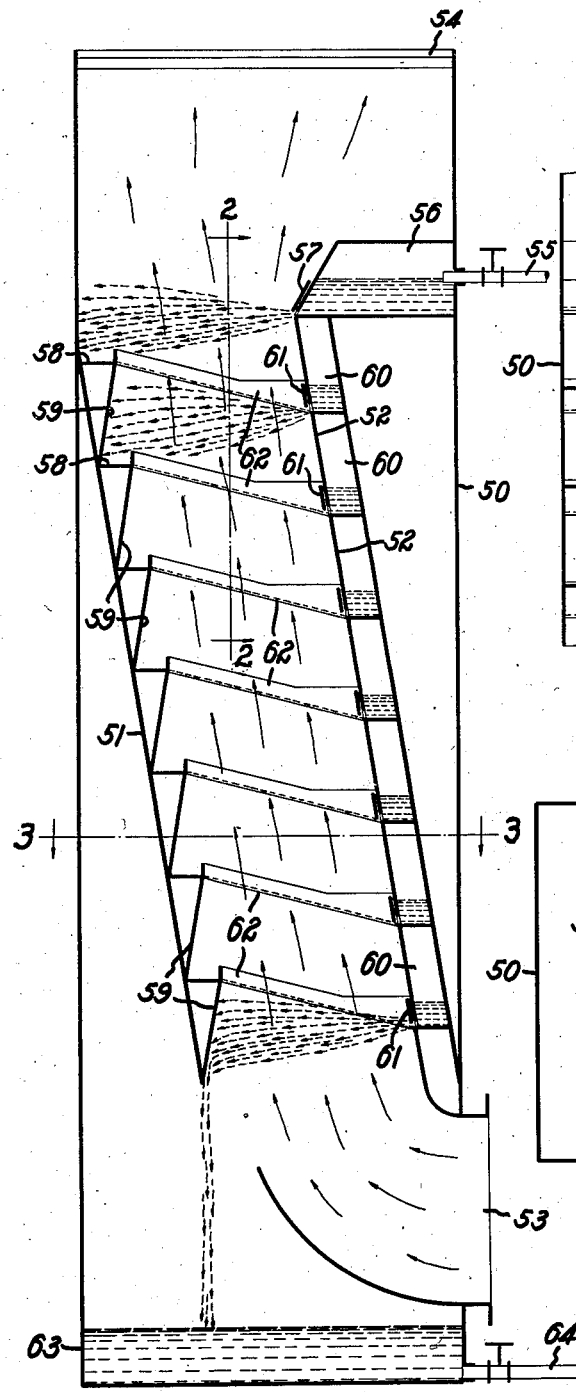
Fig. 1 is a diagrammatic sectional elevation of a cooling tower embodying the principles of the invention.
Figure 2:
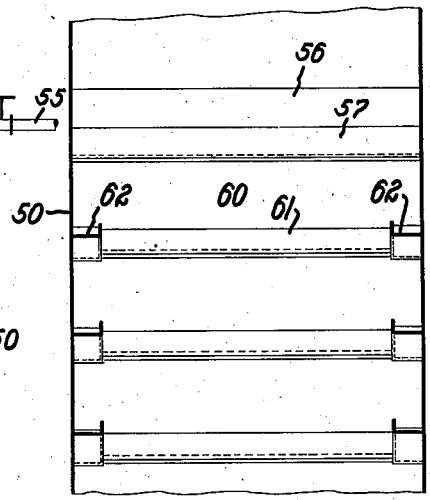
Fig. 2 is a fragmentary section on line 2—2 of Fig. 1.
Figure 3:
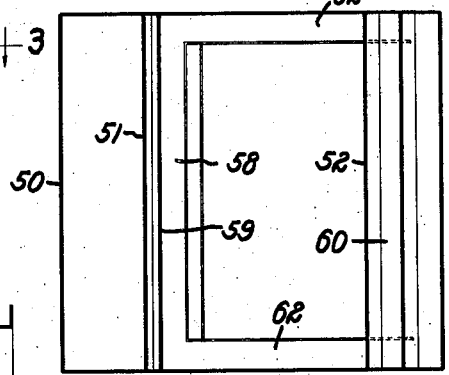
Fig. 3 is a section on line 3—3 of Fig. 1.

In the cooling tower shown in Figs. 1-3, the air stream is maintained in a generally upward direction continuously deflected from the vertical, preferably by from 5 to 15 degrees. The water stream passes generally downward through the air stream in a succession of lateral paths in each of which the water is transported across the air stream in the same direction.

In Figs. 1-3, 50 is a rectangular shell in which a gas passage having a definite but limited divergence from the vertical is provided by means of partitions 51 and 52 in cooperation with the walls of the shell and the water feeding, collecting, and conveying members to be described. The divergence from the vertical of the passage provided thereby is preferably from 5 to 15 degrees, for example, 10 degrees as shown in the figures.

A stream of air is supplied to the tower through inlet 53 and the stream passes out of the tower at the top through spray eliminator 54. The water to be cooled is supplied to the upper portion of the tower by pipe 55 leading into basin 56, provided with an outlet gate 57 along the lateral boundary of the gas passage.

At spaced intervals along the partition 51 forming the opposite or lower lateral boundary of the gas passage, a plurality of catch basins 58 are provided. These basins are advantageously supported by members 59 which also serve as guide vanes for the gas stream. At spaced intervals along partition 52 forming the upper lateral boundary of the gas passage are provided feed basins 60 having outlet gates 61. Lateral channels 62 convey water collected in catch basins 58 to the next lower feed basins 60.

Gates 57 and 61 are adjusted so that the water flows out in a uniform thin stream which, on entering an air stream having a velocity of the order of 1300 feet per minute, break up into droplets which float laterally across the air stream and are substantially all collected in the next lower catch basins 58. The water stream from the lowermost feed basin 60 passes laterally across the air stream and is collected in sump 63 from which it is withdrawn through pipe 64 for use.

While the method and apparatus of the invention have been particularly described for the purpose of illustration with reference to the cooling of water by evaporative contact with an air stream, the advantages of the invention are generally available in methods and apparatus involving the contacting of gases and liquids, such as gas washing and cooling, gaseous carrier stream evaporation, humidification and dehumidification of gases and the like.

I claim:

1. A method for contacting gases and liquids which comprises providing a generally upward stream of gas through a substantially unobstructed rectilinear path diverging from the vertical by from 5 to 15 degrees, introducing a stream of liquid into the upper portion of said gas stream at an upper lateral boundary of said path, collecting the liquid deposited from said gas stream at the lower lateral boundary of said path, and reintroducing said collected liquid into said gas stream at an upper lateral boundary of said zone of divergence at a level lower than the level of collection thereof.

2. A method for contacting gases and liquids which comprises providing a generally upward stream of gas through a substantially unobstructed rectilinear path diverging from the vertical by from 5 to 15 degrees and maintained at a velocity effective to balance liquid droplets against the force of gravity, introducing a stream of liquid into the upper portion of said gas stream at an upper lateral boundary of the said path, collecting the liquid deposited from said gas stream at the lower lateral boundary of said path, and reintroducing said collected liquid into said gas stream at an upper lateral boundary of said path at a level lower than the level of collection thereof.

3. A method for contacting gases and liquids which comprises providing a generally upward stream of gas through a substantially unobstructed rectilinear path diverging from the vertical by from 5 to 15 degrees and maintained at a velocity of from about 1100 to about 1500 feet per minute, introducing a stream of liquid into the upper portion of said gas stream at an upper lateral boundary of said path, collecting the liquid deposited from said gas stream at the lower lateral boundary of said path, and reintroducing said collected liquid into said gas stream at an upper lateral boundary of said zone of divergence at a level lower than the level of collection thereof.

4. A method for contacting gases and liquids which comprises providing a generally upward stream of gas through a substantially unobstructed rectilinear path diverging from the vertical by from 5 to 15 degrees and maintained at a velocity of the order of 1300 feet per minute, introducing a stream of liquid into the upper portion of said gas stream at an upper lateral boundary of said path, collecting the liquid deposited from said gas stream at the lower lateral boundary of said path, and reintroducing said collected liquid into said gas stream at an upper lateral boundary of said zone of divergence at a level lower than the level of collection thereof.

5. Apparatus for contacting gases and liquids comprising a conduit defining a substantially unobstructed rectilinear path for the flow of gas in a generally upward direction through at least one zone of divergence from the vertical, means for introducing a stream of liquid into said conduit at an upper lateral boundary of said conduit, means for collecting said liquid at an opposite boundary of said conduit, and means for reintroducing said collected liquid into said conduit at an upper lateral boundary of said conduit at a level lower than the level of collection.

6. Apparatus for contacting gases and liquids comprising a conduit defining a substantially unobstructed rectilinear path for the flow of gas in a generally upward direction diverging from the vertical by from 5 to 15 degrees, means for introducing a stream of liquid into said conduit at an upper lateral boundary thereof, a plurality of liquid collecting means at spaced intervals along the lower lateral boundary of said conduit, a plurality of means for the introduction of liquid into said conduit at spaced intervals along the upper lateral boundary thereof, and conduits for conveying liquid from each of said collecting means to a reintroducing means at a lower level.

STEWART C. COEY.

CERTIFICATE OF CORRECTION.

Patent No. 2,350,590. June 6, 1944.

STEWART C. COEY.

It is hereby certified that error appears in the printed specification of the above numbered patent requiring correction as follows: Page 2, second column, line 75, claim 3, strike out "zone"; page 3, first column, line 1, claim 3, strike out "of divergence" and insert instead --path--; page 2, second column, line 46, claim 1, and page 3, first column, line 15, claim 4, for "zone of divergence" read --path--; and that the said Letters Patent should be read with this correction therein that the same may conform to the record of the case in the Patent Office.

Signed and sealed this 25th day of July, A. D. 1944.

Leslie Frazer

(Seal) Acting Commissioner of Patents.